United States Patent [19]
Bible et al.

[11] 3,986,524
[45] Oct. 19, 1976

[54] VALVE CONSTRUCTION AND METHOD OF MAKING THE SAME

[75] Inventors: Harley V. Bible, Maryville; Clifford E. Goff; William T. Moon, both of Knoxville, all of Tenn.

[73] Assignee: Robertshaw Controls Company, Richmond, Va.

[22] Filed: July 16, 1975

[21] Appl. No.: 596,359

[52] U.S. Cl. .............................. 137/614.16; 251/75; 251/38
[51] Int. Cl.² ...................................... F16K 31/126
[58] Field of Search ................. 137/614.16, 614.17; 251/38, 39, 75

[56] References Cited
UNITED STATES PATENTS

| | | |
|---|---|---|
| 933,855 | 9/1909 | Selby .................................. 251/39 |
| 3,103,337 | 9/1963 | Forte .................................. 251/38 X |
| 3,485,267 | 12/1969 | Mercer ............................... 251/38 X |

*Primary Examiner*—Arnold Rosenthal
*Attorney, Agent, or Firm*—Candor, Candor & Tassone

[57] ABSTRACT

A valve construction having a housing provided with an inlet and an outlet and a movable valve seat disposed between the inlet and the outlet. A movable valve member is provided for opening and closing the valve seat. A condition responsive unit is operatively associated with the valve member to move the valve member relative to the valve seat in response to the conditions sensed by the condition responsive unit. A snap opening unit is interconnected to the valve seat to rapidly move the valve seat away from the valve member when the valve member has initially opened the valve seat a certain amount.

24 Claims, 6 Drawing Figures

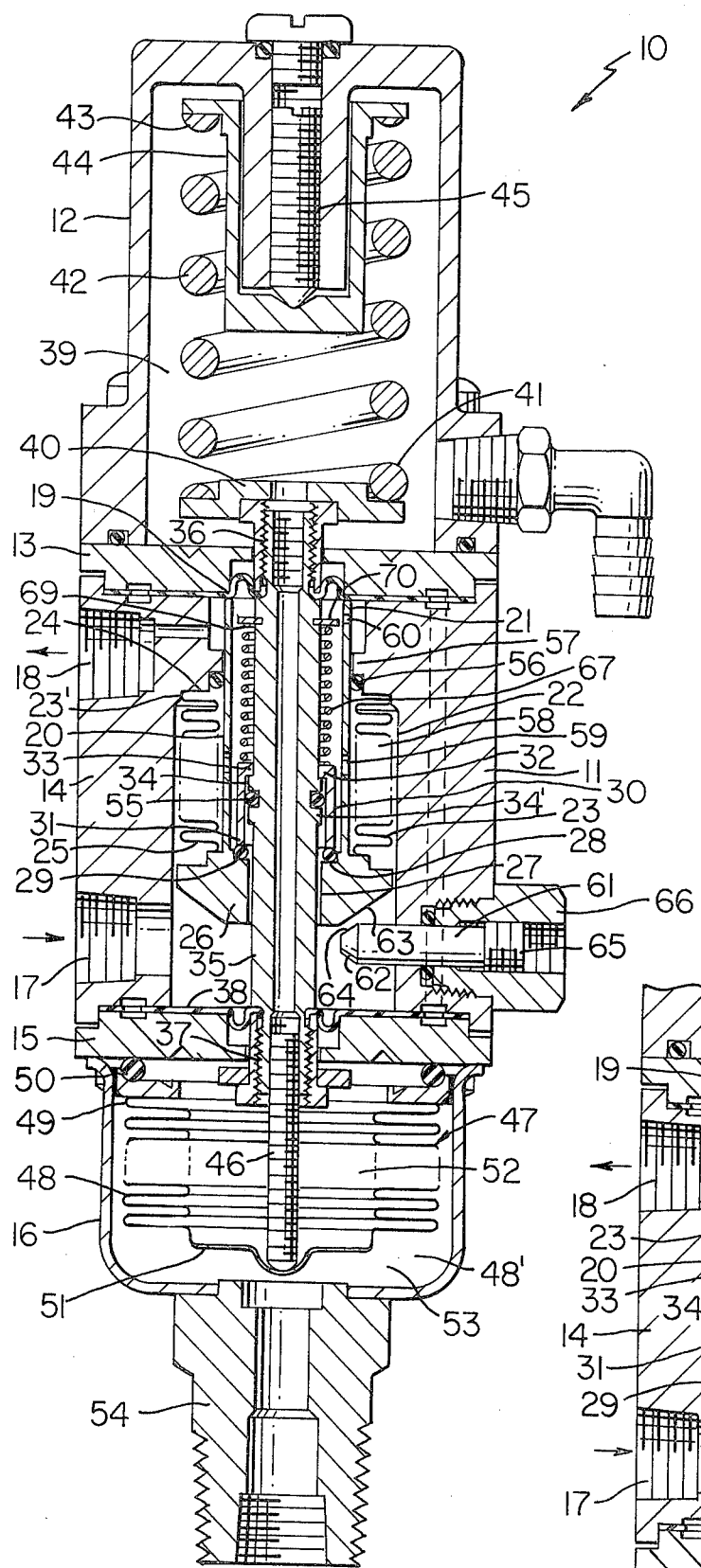
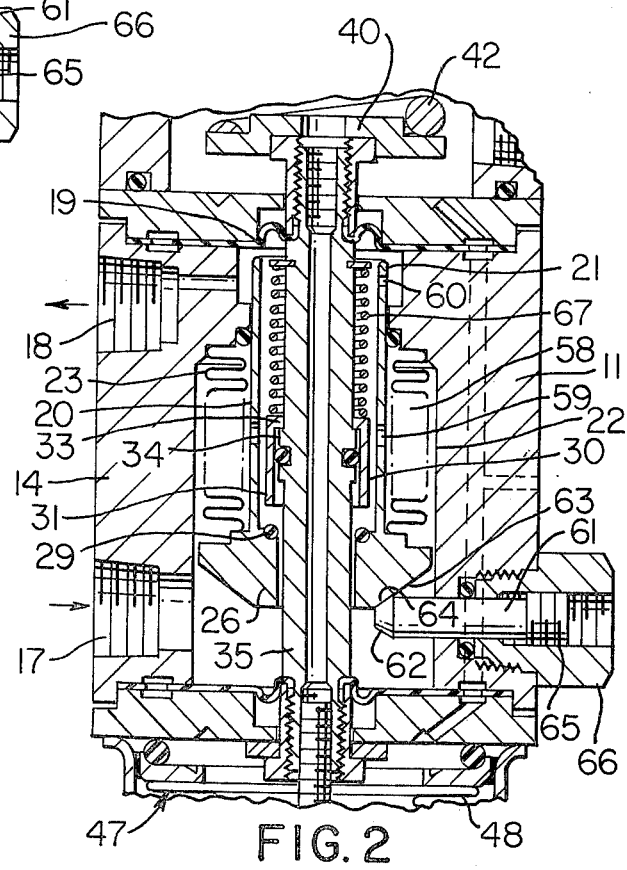
FIG. 1
FIG. 2

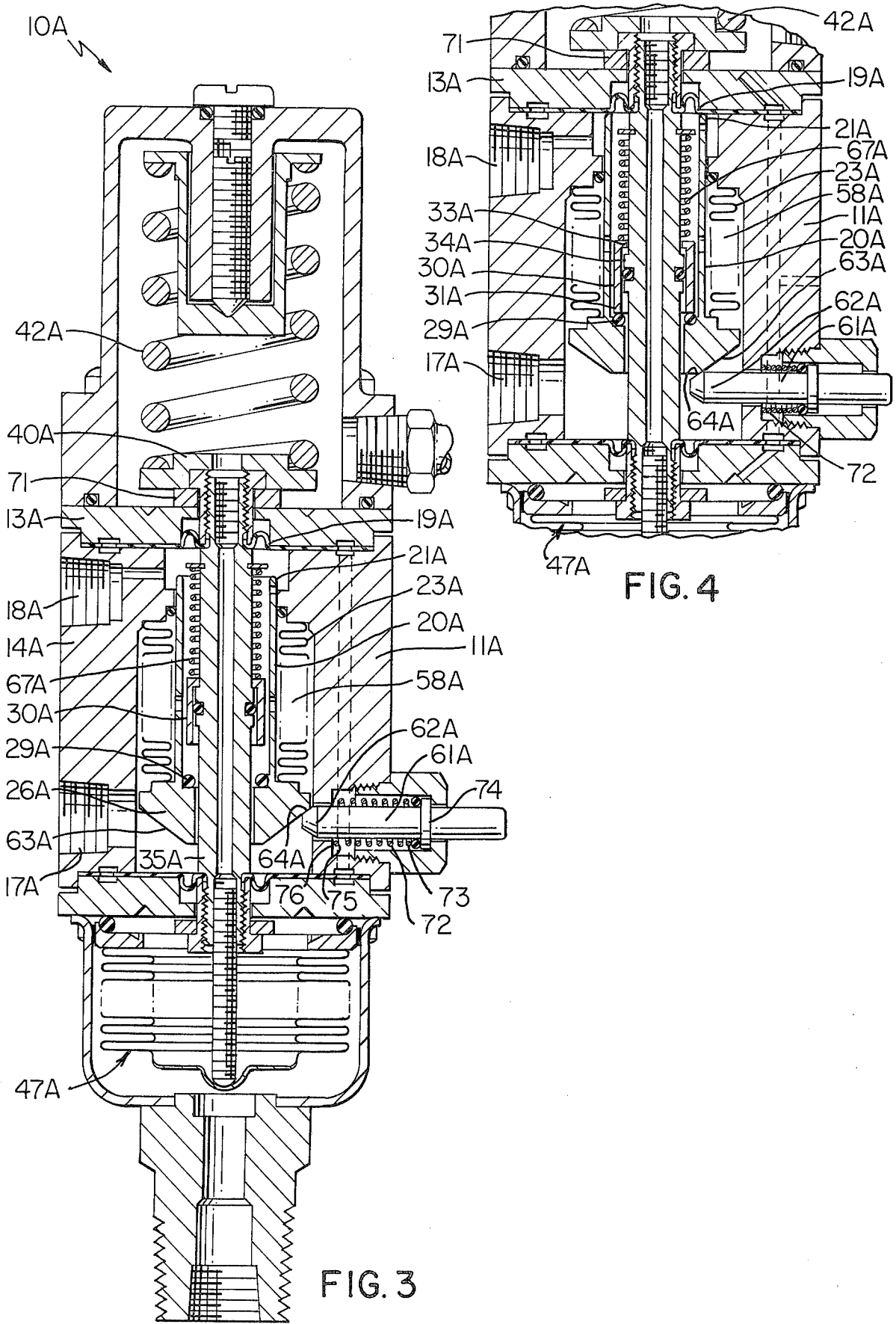

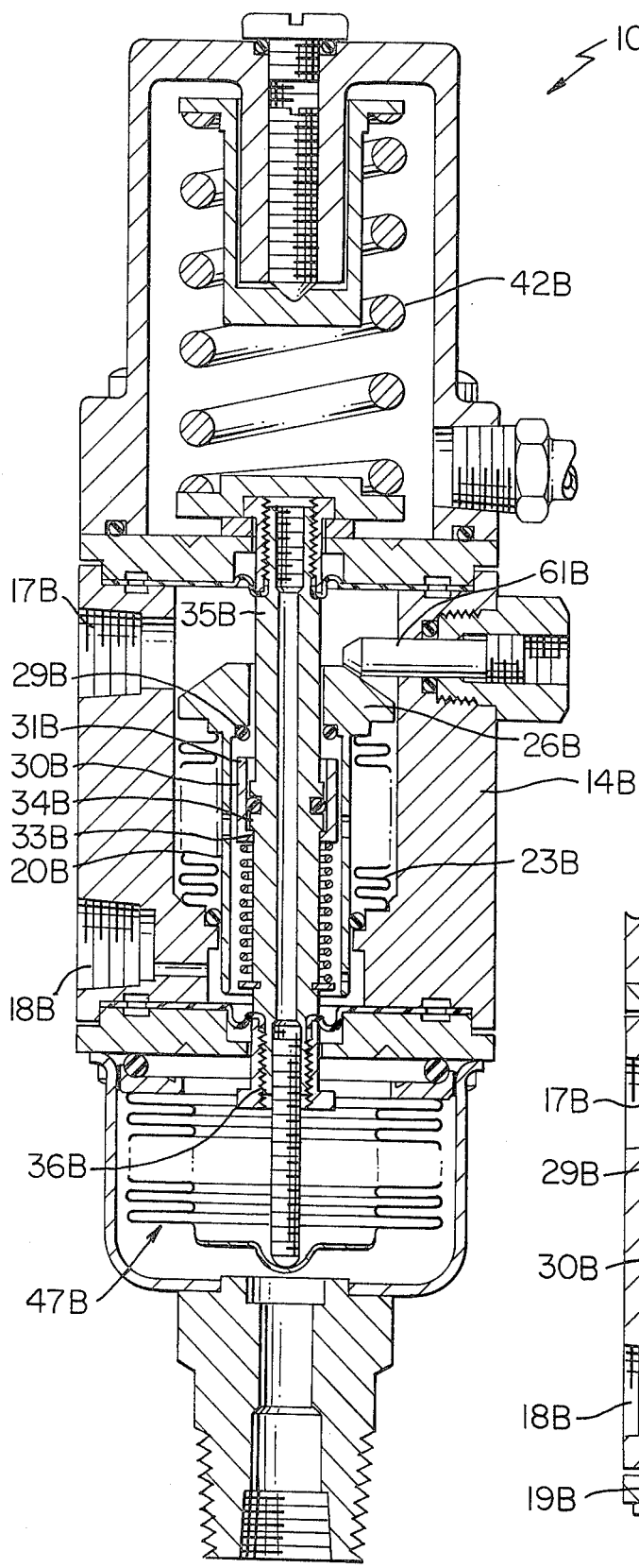
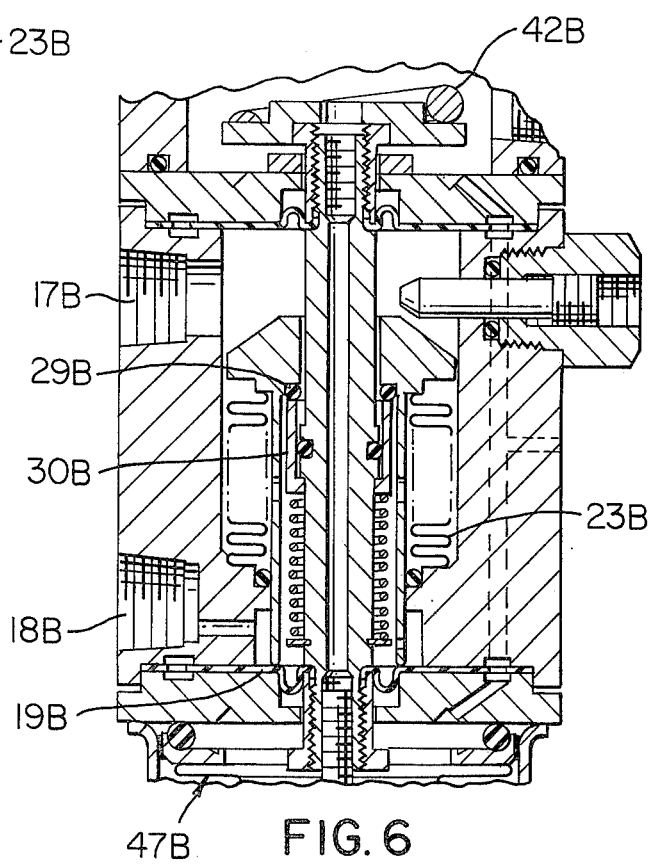
FIG. 5
FIG. 6

VALVE CONSTRUCTION AND METHOD OF MAKING THE SAME

This invention relates to an improved valve construction as well as to a method for making such a valve construction.

It is well known that valve constructions have been provided wherein each has the housing provided with an inlet and an outlet and a valve seat disposed therebetween with such valve seat being controlled by a movable valve member under the influence of a condition responsive device.

It is a feature of this invention to provide such a valve construction wherein the interconnection of the inlet with the outlet is accomplished with substantially a snap action.

In particular, one embodiment of this invention provides a valve construction having a housing provided with an inlet and an outlet and a movable valve seat disposed between the inlet and the outlet, a movable valve member being utilized for opening and closing the valve seat. A condition responsive device is carried by the housing and is operatively associated with the valve member to move the valve member relative to the valve seat in response to the conditions sensed by the condition responsive device. Means are operatively associated with the valve seat for rapidly moving the valve seat away from the valve member when the valve member has initially opened the valve seat a certain amount.

Such rapidly moving means can comprise a bellows construction which normally tends to urge the valve seat away from the valve member and which is normally held under inlet pressure to close the valve seat against a valve seat surface of the housing until the valve member is opened by the condition responsive means sensing a certain condition so that the pressure differential across the bellows construction falls substantially to zero and the natural force of the bellows construction can substantially snap open the valve seat from the valve member to thereby rapidly interconnect the inlet with the outlet.

Accordingly, it is an object of this invention to provide an improved valve construction having one or more of the novel features set forth above or hereinafter shown or described.

Another object of this invention is to provide an improved method of making such a valve construction or the like.

Other objects, uses and advangages of this invention are apparent from a reading of this description which proceeds with reference to the accompanying drawings forming a part thereof and wherein:

FIG. 1 is a cross-sectional view of one embodiment of the valve construction of this invention with the valve construction of FIG. 1 being in its closed position and being an automatic reset direct acting valve construction.

FIG. 2 is a fragmentary view similar to FIG. 1 and illustrates the valve construction of FIG. 1 in its open condition.

FIG. 3 is a view similar to FIG. 1 and illustrates another direct acting valve construction of this invention in its open condition and with manual reset means therefor.

FIG. 4 is a fragmentary view similar to FIG. 3 and illustrates the valve construction of FIG. 3 during a manual resetting operation thereof.

FIG. 5 is a view similar to FIG. 1 and illustrates another valve construction of this invention in its open condition, the valve construction of FIG. 5 being reverse acting and automatic resetting.

FIG. 6 is a fragmentary view similar to FIG. 5 and illustrates the valve construction of FIG. 5 in its closed condition.

While the various features of this invention are hereinafter illustrated and described as being particularly adapted for use in an engine control system, sugh as in the petroleum industry, it is to be understood that the various features of this invention can be utilized singly or in any combination thereof to provide a valve construction for other systems as desired.

Therefore, this invention is not to be limited to only the embodiment illustrated in the drawings, because the drawings are merely utilized to illustrate one of the wide variety of uses of this invention.

Referring now to FIGs. 1 and 2, one embodiment of the improved valve construction of this invention is generally indicated by the reference numeral 10 and comprises a housing means 11 formed from a plurality of housing sections 12, 13, 14, 15 and 16 disposed in stacked aligned relation with the housing section 14 having an inlet 17 and an outlet 18 separated by a resilient valve seat surface or diaphragm 19 in a manner hereinafter described. The valve seat surface 19 is adapted to be opened and closed by a tubular member 20 having one end 21 for closing against the valve seat surface 19 for effectively preventing fluid communication between the inlet 17 and outlet 18 as will be apparent hereinafter.

The housing section 14 has a tubular stepped chamber 22 formed therein and being in communication with the inlet 17 and outlet 18. However, a tubular bellows construction 23 is disposed in the chamber 22 and has one end 23' sealed to an annular shoulder 24 of the stepped chamber 22 and the other end 25 secured to an enlarged end 26 of the tubular member 20 whereby the tubular member 20 is, in effect, telescopically disposed within the bellows construction 20 as illustrated.

The end 26 of the tubular valve member 20 has a stepped opening 27 interrupting the same and passing completely through the tubular member 20, the stepped opening 27 defining an annular shoulder 28 inside the tubular valve member 20 and on which is disposed an annular resilient member 29, such as an O-ring, which defines a main valve seat of the valve construction 10 as will be apparent hereinafter.

A second tubular member 30 is telescopically disposed in the first tubular member 20 and has one end 31 for opening and closing the valve seat 29 as will be apparent hereinafter while the other end 32 thereof has an inwardly directly annular flange 33 for engagement with an outwardly directly annular flange 34 of a tubular stem member 35 that is telescopically disposed within the tubular members 30 and 20 and has opposed ends 36 and 37 respectively sealed and secured to the flexible wall 19 at the upper end of the housing section 14 and to a like flexible wall 38 at the other end of the section 14.

The tubular stem 35 has its upper end 36 projecting into a chamber 39 of the housing section 12 and carries a spring retained 40 against which one end 41 of an adjustable range spring 42 bears, the other end 43 of the range spring 42 bearing against a hat-shaped spring retainer 44 disposed in the chamber 39 and being adjustable therein by a threaded adjusting member 45 in a manner well known in the art whereby the force of the range spring 42 tends to drive the stem 35 downwardly relative to the housing 11.

The other end 37 of the tubular stem 35 is threadedly connected to a threaded member 46 that forms part of a condition responsive means that is generally indicated by the reference numeral 47 and is disposed in a chamber 48' of the housing section 16.

The condition responsive means 47 includes a bellows construction 48 having one end 49 welded to a bellows head that, in turn, is welded to the housing section 16 while the other end 51 of the bellows construction 48 is closed and engages the threaded member 46 whereby the bellows construction 48 defines a chamber 52 within the same that is separated from an outer chamber 53 defined by the housing section 16 and disposed in fluid communication with a pressure source (not shown) by an external nipple or coupling 54.

In this manner, the pressure differential existing across the bellows construction 48 tends to cause movement of the end 51 of the bellows construction 48 upwardly in FIG. 1 to thereby drive the fastening member 46 and tubular stem 35 upwardly in FIG. 1 in opposition to the force of the range spring 42 for a purpose hereinafter described.

Thus, the condition responsive means 47 is a pressure responsive means but it is to be understood that other types of condition responsive means can be utilized as desired.

An O-ring seal 50 seals the housing section 16 to the housing section 15 as illustrated.

The stem 35 has an annular sealing member 55 adjacent the shoulder or flange 34 thereof and held between such flange 34 and other like flange 34' of the stem 35 for being disposed in sliding and sealing engagement with the internal peripheral surface of the tubular member 30. Similarly, the housing section 14 carries an annular sealing member 56 adjacent an annular inwardly directed shoulder 57 thereof and is disposed in sliding and sealing engagement with the external peripheral surface of the tubular member 20.

Thus, the tubular member 20 cooperates with the bellows construction 23 to define a chamber 58 therebetween which is adapted to be fluidly interconnected into the interior of the tubular member 20 intermediate the valve seat 29 and valve seat surface 19 by opening means 59 formed through the tubular member 20, the interior of the tubular member 20 being adapted to be interconnected to the outlet 18 by other opening means 60 formed through the tubular member 20 adjacent the upper end 21 thereof for a purpose hereinafter described.

A stop member 61, comprising a pin, has an end 62 thereof projecting into the stepped chamber 22 of the housing section 14 to be engaged by an annular beveled surface 63 of the end 26 of the tubular member 20 when the same has moved donwardly in a manner hereinafter described and as illustrated in FIG. 2, and end 62 of the stop member 61 also providing an annular beveled surface 64 that cooperates with the beveled surface 63 of the tubular member 20 so that inward and outward axial adjustment of the pin 61 through its threaded relation at its end 65 with an internally threaded retainer 66 of the housing section 14 will permit an adjustment of the amount of opening movement of the end 21 of the tubular member 20 relative to the valve seat surface 19 as the movement of the tubular member 20 is limited in an inward direction by the end 21 engaging the valve seat surface 19 and in the downward direction by its valve seat end 26 engaging the pin 61 as illustrated in FIG. 2. The adjustment of the axial position of the stop member 61 adjusts the operating pressure differential for the valve construction 10 as will be apparent hereinafter.

The valve member 30 is urged toward the main valve seat 29 by a compression spring 67 having one end bearing against the end 32 of the valve member 30 and its other end 69 bearing against a retainer 70 carried by the stem 35 for a purpose hereinafter described.

Therefore, it can be seen that the valve construction 10 of this invention can be formed of relatively simple parts to be assembled in a relatively simple manner to provide a valve construction that will open the valve seat 29 to interconnect the inlet 17 to the outlet 18 when the condition responsive means 47 senses a certain condition and will automatically close the valve seat 29 to disconnect the inlet 17 from the outlet 18 when the condition responsive means 47 senses another certain condition, the valve construction 10 being direct acting whereby a rising condition will open the valve seat 29 when a certain condition is sensed and a falling condition will close the valve seat 29 when another certain condition is sensed.

In particular, the operation of the valve construction 10 will now be described.

Assuming that the valve construction 10 is to monitor the pressure of a system so that when the pressure being sensed by the device 47 reaches a certain value, the inlet 17 is to be interconnected to the outlet 18 to vent the prssure at the inlet 17 until the pressure being sensed by the device 47 falls below that certain value to another certain value, the range spring 42 is adjusted by the adjusting member 45 to the selected value that the device 47 is to open the inlet 17 to the outlet 18 whereby as long as the pressure being sensed by the device 47 is below that certain value, the force of the range spring 42 is sufficient to maintain the stem 35 downwardly relative to the valve member 30 so that the annular flange 34 of the stem 35 permits the tubular valve member 30 to have its end 31 closed against the main valve seat 29 as illustrated in FIG. 1 by the force of the compression spring 67 whereby the fluid pressure from the inlet 17 and entering the chamber 22 of the inlet 17 is completely prevented from passing from around the stem 35 at the opening 27 in the valve seat end 26 of the tubular member 20 to the interior of the tubular member 20 and to the chamber 58 of the bellows construction 23. Thus, the force of the fluid pressure in the chamber 22 and acting on the exterior of the bellows construction 23 causes the same, in opposition to the normal expanding biasing force of the bellows construction 23, to hold the end 21 of the tubular member 20 against the valve seat surface 19, the interior chamber 58 of the bellows construction 23 and the interior of the tubular member 20 being vented to the outlet 18 by the openings 59 and 60 of the tubular valve member 20 as illustrated in FIG. 1.

Therefore, as long as the pressure being sensed by the device 47 stays below the selected setting of the range spring 42, the valve construction 10 remains in the closed position illustrated in FIG. 1 whereby the inlet 17 is blocked from the outlet 18 by the closed seat 29.

However, when the pressure being sensed by the device 47 is at the selected pressure setting of the range spring 42 or slightly above the same, such pressure in the chamber portion 53 acting against the exterior of the bellows construction 48 has moved the end 51 of the bellows construction 48 upwardly in opposition to the force of the range spring 42 in a manner sufficient to have the annular flange 34 of the stem 35 engaged against the inwardly directed annular flange 33 of the valve member 30 and carry the same upwardly therewith to move the end 31 of the valve member 30 away from the valve seat 29 and thereby interconnect the inlet 17 through the now open valve seat 29 into the interior of the valve seat member 20 and, thus, the interior chamber 58 of the bellows construction 23. At this time, the pressure across the bellows construction 23 substantially equalizes as the port 60 is relatively small (approximately 0.010 of an inch in diameter) whereby the natural force of the bellows construction 23 drives the tubular valve seat member 20 downwardly with substantially a snap action until the valve seat end 26 of the valve seat member 20 engages against the stop member 61 in the manner illustrated in FIG. 2. In this manner the valve seat 29 is fully and rapidly opened by the downwardly moving valve seat member 20 away from the valve member 30 so that the inlet 17 is now fluidly interconnected through the opened valve seat 29 to the outlet or vent 18 as illustrated in FIG. 2 until the pressure being sensed by the device 47 decreases to a pressure below the pressure setting of the range spring 42 as will be apparent hereinafter. Such downward movement of the valve seat member 20 away from the valve member 30 also moves the end 21 of the valve seat member 20 away from the valve seat surface 19 so that the inlet 17 can be fully interconnected to the outlet 18.

The valve construction 10 now remains in the open position illustrated in FIG. 2 until the pressure being sensed by the device 47 falls a certain differential below the setting of the range spring 42 because the range spring 42 must move the valve stem 35 downwardly from the position illustrated in FIG. 2 upon the falling of the pressure being sensed by the device 47 until the end 31 of the valve member 30 again engages against the valve seat 29 to close off communication from the inlet 17 to the interior of the valve seat member 20 and interior chamber 58 of the bellows construction 23 so that the interior chamber 58 of the bellows construction 23 and the interior of the valve seat member 20 will have the pressure therein vented to the outlet 18 through the respective openings 59 and 60 of the valve member 20 as well as through the opening between the valve seat surface 19 and the end 21 of the valve seat member 20. Thus, a pressure differential again builds up across the bellows construction 23 to overcome the natural resiliency thereof and drive the valve seat member 20 upwardly to move the end 21 thereof in its closed position against the valve seat surface 19 as illustrated in FIG. 1. Such upward movement of the valve seat member 20 carries the valve member 30 therewith in opposition to the force of the compression spring 67 so that the valve construction 10 is automatically reset in its closed position after the pressure being sensed by the device 47 falls below another pressure valve that is below the certain valve that must be reached in order for the valve construcction 10 to be moved to its open condition as previously set forth, such differential in the pressure required for opening and closing the valve construction 10 being adjusted by the axial position of the stop pin 61 relative to the valve seat end 26 of the valve seat member 20 as previously described.

Thus, it can be seen that the valve construction 10 is direct acting and automatically reset itself to its closed condition after the particular condition being monitored by the condition responsive means 47 falls to or slightly below a resetting pressure that is below the opening pressure of the valve construction 10 by a certain differential determined by the setting of the stop pin 61.

However, it is to be understood that the valve construction 10 of this invention can be made in such a manner that the same must be manually reset back to its closed position after the same has been opened by the condition responsive means 47 sensing a rise in the pressure to a certain value thereof as set by the range spring 42.

In particular, such a valve construction is generally indicated by the reference numeral 10A in FIGS. 3 and 4 and parts thereof similar to the valve construction 10 previously described are indicated by like reference numerals followed by the reference letter A.

As illustrated in FIGS. 3 and 4, the valve construction 10A is substantially identical to the valve construction 10 previously described except that the stop pin 61A of the valve construction 10A is made manually movable relataive to the housing means 11A and a washer-like member 71 is disposed between the housing section 13A and the spring retainer 40A for the range spring 42A to limit downward movement of the stem 35A whereby the range spring 42A will bottom out the spring retainer 40A against the washer-like member 71 upon falling pressure being sensed by the condition responsive means 47A. Thus, the valve member 30A cannot seat against the valve seat 29A when the valve construction 10A is in the open condition illustrated in FIG. 3 even though the pressure being sensed by the device 47A has fallen well below the pressure that would cause the valve construction 10 previously described to automatically reset itself.

The movable stop pin 61A is normally urged to its out position by a compression spring 72 having one end 73 bearing against an annular flange 74 of the stop pin 61A and another end 75 bearing against a shoulder 76 of the housing section 14A whereby the position of the end 62A of the stop pin 61A is normally in the location illustrated in FIG. 3 where the beveled surface 63A of the end 26A of the tubular valve seat member 20A engages against the same to limit the opening movement of the valve member 20A as illustrated in FIG. 3.

However, when the operator pushes inwardly on the stop pin 61A to the position illustrated in FIG. 4, the camming action of the beveled surface 64A of the pin end 62A against the beveled surface 63A of the valve seat member 20A is such that the valve seat member 20A is moved upwardly so that the end 21A thereof will be disposed against the valve seat surface 19A is illustrated in FIG. 4 to manually reset the valve construction 10A.

In particular, the operation of the valve construction 10A will now be described.

Assuming that the valve construction 10A has been opened in the manner previously described for the valve construction 10 where the pressure being sensed by the condition responsive means 47A increased to or rose slightly above the pressure setting of the range spring 42A so that the valve seat member 20A is disposed in its down position against the stop member 61A as illustrated in FIG. 3, and assuming that subsequently the pressure being sensed by the device 47A has fallen below the pressure that would normally automatically reset the valve construction 10 previously described, the stem 35A has been moved downwardly by the range spring 42A in the manner illustrated in FIG. 3 so that the spring retainer 40A has bottomed out against the washer-like member 71. However, such downward movement of the stem 35A is not sufficient to cause the valve member 30A to close against the valve seat 29A so that the valve construction 10A cannot automatically reset itself as previously described for the valve construction 10.

However, the operator can move the manual reset means 61A inwardly from the position illustrated in FIG. 3 to the position illustrated in FIG. 4 whereby the valve seat member 20A is cammed upwardly so that the end 21A thereof is disposed against the valve seat surface 19A and the valve seat 29A is now disposed against the end 31A of the second valve member 30A so that the inlet 17A is now closed off from the interior of the valve member 20A. Thus, the resulting pressure differential now created across the bellows construction 23A will hold the bellows construction 23A in the up position illustrated in FIG. 4 so that when the reset member 61A is released and the spring 72 moves the same back to the out position illustrated in FIG. 3, the valve members 21A and 30A will remain in their respective closed positions against the valve seat surface 19A and valve seat 29A as illustrated in FIG. 4 as the pressure being sensed by the condition responsive means 47A is below the pressure which will cause opening of the valve construction 10A. Thus, the shoulder 34A of the stem 35A is below the flange 33A of the valve member 30A whereby the compression spring 67A maintains the valve member 30A in its closed position.

Therefore, it can be seen that the valve construction 10A of this invention is a direct acting valve construction having manual reset means and can be formed from the same structure that forms the valve construction 10 previously described by merely utilizing the stop washer 71 and the manual reset stop pin 61A in place of the fixed stop pin 61 of the valve construction 10 previously described.

While the valve constructions 10 and 10A previously described are direct acting, it is to be understood that the various features of this invention can be utilized to form a reverse acting valve construction with the same being automatically reset or manually reset as desired by utilizing the same parts of the valve constructions 10 and 10A in a slightly different assembled relation.

In particular, reference is now made to FIGS. 5 and 6 wherein another valve construction of this invention is generally indicated by the reference numeral 10B and parts thereof similar to the valve construction 10 and 10A are indicated by like reference numerals followed by the reference letter B.

As illustrated in FIGS. 5 and 6, the reverse acting valve construction 10B of this invention is substantially identical to the valve construction 10 previously described except that the housing section 14B, stem 35B and valve member arrangement 20B, 30B is turned 180° from the position illustrated in FIG. 1 whereby the inlet 17B is above the outlet 18B in FIGS. 5 and 6.

However, it can readily be seen that when the valve construction 10B is in the closed position illustrated in FIG. 6, a falling pressure being sensed by the condition responsive device 47B will cause the flange 34B of the stem 35B to engage the flange 33B of the valve member 30B and move the end 31B thereof away from the valve seat 29B when the pressure drops to a certain pressure as set by the range spring 42B whereby the opening of the valve seat 29B causes the substantial equalization of the pressure across the bellows construction 23B so that the same snaps the valve seat member 20B to the fully open position illustrated in FIG. 5 wherein the valve seat end 26B of the valve seat member 20B abuts the stop member 61B whereby the inlet 17B is now fully interconnected to the outlet 18B.

Subsequently, an increase in pressure being sensed by the condition responsive means 47B will automatically reset the valve construction 10B when such pressure reaches another valve that will cause the valve member 30B to again close against the valve seat 29B due to the upward movement of the stem 35B whereby once the valve member 30B closes against the valve seat 29B, the resulting pressure differential across the bellows construction 23B causes the same to move downwardly from the position illustrated in FIG. 5 to the position illustrated in FIG. 6 and thereby close the valve seat surface 19B which will remain closed until the pressure being sensed by the device 47B again falls to the certain pressure setting of the range spring 42B.

Of course, the reverse acting valve construction 10B can be made to be manually reset by merely utilizing the washer 71 of the valve construction 10A intermediate the end 36B of the stem 35B and the housing section 15B as well as by replacing the stop pin 61B with the manually movable reset member 61A and its associated retainer and spring of the valve construction 10A of FIGS. 3 and 4.

Therefore, it can be seen that the valve constructions 10, 10A and 10B of this invention can be readily made from substantially the same parts and be field changed to change the action thereof, as desired.

Thus, it can be seen that the valve constructions of this invention can each be a sealed waterproof device and when utilized in adverse climate, the various parts thereof can be piped to a more suitable climate to prevent unwanted media from entering the assembly.

The M.E.A. of the main valve seat 29, 29A or 29B is balanced with the M.E.A. of the diaphragm 38, 38A or 38B so that a change in supplied pressure has little or no effect on the set point of the valve construction. The M.E.A. of the valve seat 29, 29A or 29B is also balanced with the M.E.A. of the diaphragm 19, 19A or 19B so that a change in vent back pressure, in a case of a piped vent system, has little or no effect on the set point of the valve construction.

Each valve construction of this invention also has a wide variable differential range that can be field adjusted without having an effect on the set point thereof. Also, each basic valve construction of this invention is field reversible, i.e., direct acting can be made reverse acting and vice versa. Also automatic reset can be made manual reset and vice versa.

The valve constructions of this invention each utilizes an equalization chamber inside the valve seat member 20, 20A or 20B that is designed to cause spontaneous snap action, thus eliminating sizzle or bleeding down of the pressure in the chamber 22, 22A or 22B below the valve member 20, 20A or 20B before snap action occurs.

Also, the simplicity of the design of the valve construction 10, 10A or 10B makes for easier assembly, calibration and more stable reliable operation under adverse conditions.

Thus, it can be seen that the valve construction of this invention provides a reliable, waterproof, snap acting pressure sensor that is easily assembled and calibrated, is relatively unaffected by change in supply pressure or vent back pressure and is provided with a wide differential range that can be adjusted or varied without changing the set point thereof.

Accordingly, it can be seen that this invention not only provides an improved valve construction, but also this invention provides an improved method of making such a valve construction or the like.

While the forms and methods of this invention now preferred have been illustrated and described as required by the Patent Statute, it is to be understood that other forms and method steps can be utilized and still fall within the scope of the appended claims.

What is claimed is:

1. A valve construction having a housing provided with an inlet and an outlet and a movable valve seat disposed between said inlet and said outlet, a movable valve member for opening and closing said valve seat, condition responsive means carried by said housing and being operatively associated with said valve member to move said valve member relative to said valve seat in response to the condition sensed by said condition responsive means, means operatively associated with said valve seat for rapidly moving said valve seat away from said valve member when said valve member has initially opened said valve seat a certain amount, and biasing means carried by said housing and being operatively associated with said valve seat to tend to urge said valve seat in one direction relative to said valve member, said biasing means comprising a tubular bellows construction having one end interconnected to said housing and another end interconnected to said valve seat, said housing having a valve seat surface disposed between said inlet and said outlet, said valve seat being tubular and having one end interconnected with said other end of said bellows construction and another end for opening and closing said valve seat surface.

2. A valve construction as set forth in claim 1 wherein said valve seat is telescoped in said bellows construction.

3. A valve construction as set forth in claim 1 wherein said valve member is tubular and has one end for opening and closing said valve seat.

4. A valve construction as set forth in claim 3 wherein said valve seat is telescoped in said bellows construction and said valve member is telescoped in said valve seat.

5. A valve construction as set forth in claim 1 wherein said housing carried a stop member spaced from said valve seat, said valve seat being movable between said valve seat surface and said stop member and being limited in such movement of engagement respectively with said valve seat surface and said stop member.

6. A valve construction as set forth in claim 5 wherein said bellows construction normally tends to open said valve seat from said valve seat surface and move said valve seat against said stop member.

7. A valve construction as set forth in claim 6 wherein said stop member is movable relative to said housing to a position thereof that causes said valve seat to engage said valve seat surface.

8. A valve construction as set forth in claim 7 wherein said stop member has means tending to move said stop member out of said position thereof.

9. A valve construction as set forth in claim 1 wherein said valve seat surface is disposed between said outlet and said valve seat whereby fluid pressure from said inlet is adapted to hold said valve seat in its closed position against said valve seat surface when said valve member is in its closed position against said valve seat, said bellows construction tending to move said valve seat away from said valve seat surface.

10. A valve construction as set forth in claim 9 wherein said condition responsive means is adapted to move said valve member away from said valve seat when said condition responsive means senses a certain condition so that the fluid pressure can equalize across said bellows construction and said bellows construction can snap open said valve seat from said valve member through the natural resiliency of said bellows construction.

11. A valve construction as set forth in claim 10 wherein said housing has means for resetting said valve seat against said valve seat surface after said condition changes from said certain condition.

12. A valve construction as set forth in claim 1 wherein another biasing means is carried by said housing and is operatively associated with said valve member to tend to urge said valve member in one direction relative to said valve seat.

13. A method of making a valve construction comprising the steps of providing a housing with an inlet and an outlet and a movable valve seat disposed between said inlet and said outlet, disposing a movable valve member in said housing for opening and closing said valve seat, securing a condition responsive means to said housing to be operatively associated with said valve member to move said valve member relative to said valve seat in response to the condition sensed by said condition responsive means, interconnecting means to said valve seat to rapidly move said valve seat away from said valve member when said valve member is initially opened from said valve seat a certain amount, disposing biasing means in said housing to be operatively associated with said valve seat to tend to urge said valve seat in one direction relative to said valve member, forming said biasing means from a tubular bellows construction, securing one end of said bellows construction to said housing and another end thereof to said valve seat, forming a valve seat surface in said housing between said inlet and said outlet, forming said valve seat from a tubular member, and securing one end of said tubular member to said other end of said bellows construction so that another end of said tubular member is adapted for opening and closing said valve seat surface.

14. A method of making a valve construction as set forth in claim 13 and including the step of telescopically disposing said valve seat in said bellows construction.

15. A method of making a valve construction as set forth in claim 13 and including the step of forming said valve member from a tubular member having one end adapted for opening and closing said valve seat.

16. A method of making a valve construction as set forth in claim 15 and including the step of telescopically disposing said valve seat in said bellows construction, and telescopically disposing said valve member in said valve seat.

17. A method of making a valve construction as set forth in claim 13 and including the step of disposing a stop member in said housing so as to be spaced from said valve seat whereby said valve seat is movable between said valve seat surface and said stop member and is limited in such movement by engagement respectively with said valve seat surface and said stop member.

18. A method of making a valve construction as set forth in claim 17 wherein said bellows construction normally tends to open said valve seat from said valve seat surface and move said first valve member against said stop member.

19. A method of making a valve construction as set forth in claim 18 and including the step of forming said stop member to be movable relative to said housing to a position thereof that causes said valve seat to engage said valve seat surface.

20. A method of making a valve construction as set forth in claim 19 and including the step of forming said stop member with means tending to move said stop member out of said position thereof.

21. A method of making a valve construction as set forth in claim 13 and including the step of disposing said valve seat surface between said outlet and said valve seat whereby fluid pressure from said inlet is adapted to hold said valve seat in its closed position against said valve seat surface when said valve member is in its closed position against said valve seat, said bellows construction tending to move said valve seat away from said valve seat surface.

22. A method of making a valve construction as set forth in claim 21 and including the step of disposing said condition responsive means so as to be adapted to move said valve member away from said valve seat when said condition responsive means senses a certain condition so that the fluid pressure can equalize across said bellows construction and said bellows construction can snap open said valve seat from said valve member through the natural resiliency of said bellows construction.

23. A method of making a valve construction as set forth in claim 22 and including the step of providing said housing with means for resetting said valve seat against said valve seat surface after said condition changes from said certain condition.

24. A method of making a valve construction as set forth in claim 13 and including the step of disposing another biasing means in said housing to be operatively associated with said valve member to tend to urge said valve member in one direction relative to said valve seat.

* * * * *